(12) United States Patent
Mouafik et al.

(10) Patent No.: US 10,257,879 B2
(45) Date of Patent: Apr. 9, 2019

(54) METHOD FOR SIMPLIFYING THE CONTROL SESSION OF A USER SESSION

(71) Applicant: Orange, Paris (FR)

(72) Inventors: Ali-Amine Mouafik, Boulogne-Billancourt (FR); Eric Barault, Thorigne Fouillard (FR)

(73) Assignee: ORANGE, Paris (FR)

( * ) Notice: Subject to any disclaimer, the term of this patent is extended or adjusted under 35 U.S.C. 154(b) by 73 days.

(21) Appl. No.: 15/304,778

(22) PCT Filed: Apr. 9, 2015

(86) PCT No.: PCT/FR2015/050941
§ 371 (c)(1),
(2) Date: Oct. 17, 2016

(87) PCT Pub. No.: WO2015/158991
PCT Pub. Date: Oct. 22, 2015

(65) Prior Publication Data
US 2017/0041980 A1 Feb. 9, 2017

(30) Foreign Application Priority Data

Apr. 17, 2014 (FR) ...................................... 14 53509

(51) Int. Cl.
*H04W 76/20* (2018.01)
*H04W 76/30* (2018.01)
*H04M 15/00* (2006.01)

(52) U.S. Cl.
CPC ........... *H04W 76/20* (2018.02); *H04M 15/66* (2013.01); *H04M 15/8016* (2013.01); *H04M 15/8228* (2013.01); *H04W 76/30* (2018.02)

(58) Field of Classification Search
CPC ............. H04M 15/66; H04M 15/8016; H04M 15/8228; H04M 15/00; H04M 15/765;
(Continued)

(56) References Cited

U.S. PATENT DOCUMENTS

2012/0081557 A1* 4/2012 Kupinsky ........... H04L 12/1407
348/207.1
2012/0099715 A1* 4/2012 Ravishankar ....... H04L 12/1407
379/114.01
(Continued)

FOREIGN PATENT DOCUMENTS

EP 2268094 A1 12/2010

OTHER PUBLICATIONS

English translation of the Written Opinion of the International Searching Authority, dated Jul. 6, 2015, for corresponding International Application No. PCT/FR2015/050941, filed Apr. 9, 2015.
(Continued)

*Primary Examiner* — Jamal Javaid
*Assistant Examiner* — Rosene Clark
(74) *Attorney, Agent, or Firm* — David D. Brush; Westman, Champlin & Koehler, P.A.

(57) ABSTRACT

A method for establishing at least one control rule for a communication session between a packet communication network and a mobile terminal linked to a mobile network, referred to as a user session, which is carried by a connection between the mobile terminal and a gateway of the mobile network. The gateway is connected to the packet communication network, and a control session is carried by a connection between the gateway and a control entity of the mobile network. The method is implemented by the control entity.

8 Claims, 3 Drawing Sheets

Figure 1:
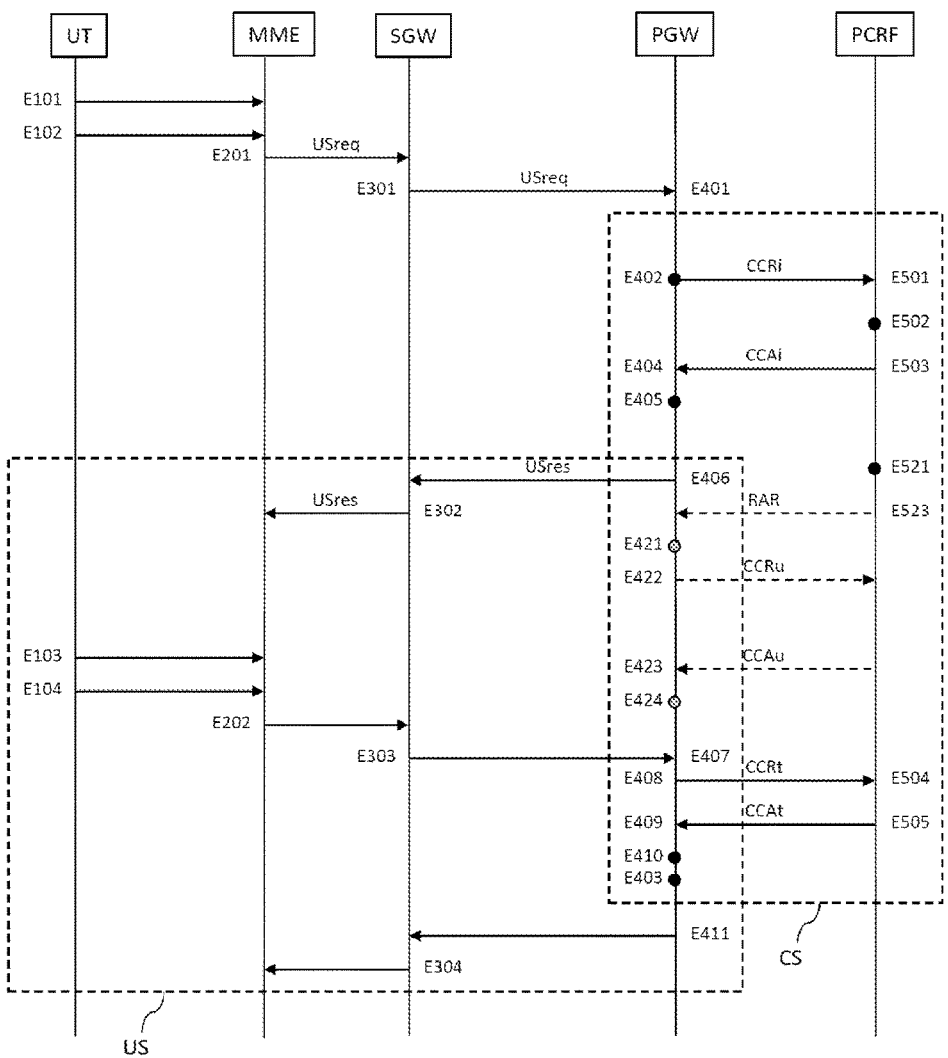

(58) Field of Classification Search
CPC ..... H04W 76/04; H04W 76/06; H04W 24/08;
H04W 28/0268; H04W 4/005; H04W
72/08; H04L 41/5025; H04L 41/5067;
H04L 12/1407
See application file for complete search history.

(56) References Cited

U.S. PATENT DOCUMENTS

| | | | | |
|---|---|---|---|---|
| 2013/0012204 | A1* | 1/2013 | Kim | H04W 60/06 455/435.1 |
| 2014/0013383 | A1* | 1/2014 | Pancorbo-Marcos | H04L 63/102 726/1 |
| 2014/0199961 | A1* | 7/2014 | Mohammed | H04L 63/0428 455/406 |
| 2014/0321365 | A1* | 10/2014 | Shoji | H04W 60/06 370/328 |
| 2015/0245196 | A1* | 8/2015 | Rivas Molina | H04W 8/186 370/259 |
| 2015/0296321 | A1* | 10/2015 | Kim | H04W 8/02 370/329 |
| 2015/0341851 | A1* | 11/2015 | Cai | H04W 4/08 455/434 |
| 2016/0323766 | A1* | 11/2016 | Mohammed | H04L 12/1407 |
| 2017/0019424 | A1* | 1/2017 | Rodrigues De Moura Leitao | H04L 63/08 |
| 2017/0019750 | A1* | 1/2017 | Palanisamy | H04W 28/0289 |

OTHER PUBLICATIONS

International Search Report dated Jul. 6, 2015, for corresponding International Application No. PCT/FR2015/050941, filed Apr. 9, 2015.
Nortel Networks, "Complete the transient failures result codes", 3GPP Draft; N3-050044. 3rd Generation Partnership Project (3GPP), Mobile Competence Centre, 650, Route Des Lucioles; F-06921 Sophia-Antipolis Cedex, France, vol. CN WG3, No. Sydney. Australia; Feb. 7, 2005, Feb. 7, 2005 (Feb. 7, 2005), XP050077517.
"3rd Generation Partnership Project; Technical Specification Group Core Network; Charging rule provisioning over Gx interface; (Release 6)", 3GPP Standard; 3GPP TS 29.210. 3rd Generation Partnership Project (3GPP), Mobile Competence Centre; 650, Route Des Lucioles; F-06921 Sophia-Antipolis Cedex; France, No. V6.0.0 Dec. 1, 2004 (Dec. 1, 2004), pp. 1-19, XP050372306.
"3rd Generation Partnership Project; Technical Specification Group Services and System Aspects; Telecommunication management; Charging management; Diameter charging applications (Release 8)", 3GPP Standard; 3GPP TS 32.299. 3rd Generation Partnership Project (3GPP), Mobile Competence Centre; 650, Route Des Lucioles; F-06921 Sophia-Antipolis Cedex; France, vol. SA WG5. No. V8.22. 0, Mar. 14, 2014 (Mar. 14, 2014), pp. 1-143, XP050769856.
Hakala et al., "Diameter Credit-Control Application; rfc4006.txt". Aug. 1, 2005, Aug. 1, 2005 (Aug. 1, 2005), XP015041993.
"3rd Generation Partnership Project; Technical Specification Group Core Network and Terminals; Policy and Charging control (PCC) over Gx reference point (Release 8) ", 3GPP Standard; 3GPP TS 29.212. 3rd Generation Dartnership Project (3GPP), Mobile Competence Centre; 650, Route Des Lucioles; F-06921 Sophia-Antipolis Cedex; France, vol. CT WG3, No. V8.22.0, Mar. 10, 2014 (Mar. 10, 2014), pp. 1-105, XP050769648.
"3rd Generation Partnership Project; Technical Specification Group Core Network and Terminals; Policy and Charging Control signalling flows and Quality of Service (QoS) parameter mapping (Release 8)", 3GPP Standard; 3GPP TS 29.213. 3rd Generation Partnership Project (3GPP), Mobile Competence Centre; 650, Route Des Lucioles; F-06921 Sophia-Antipolis Cedex; France, vol. CT WG3, No. V8.16. 0, Mar. 15, 2013 (Mar. 15, 2013), pp. 1-128, XP050692155.
"3rd Generation Partnership Project; Technical Specification Group Services and System Aspects; Policy and charging control architecture (Release 8)" 3GPP Standard; 3GPP TS 29.213. 3rd Generation Partnership Project (3GPP), Mobile Competence Centre; 650, Route Des Lucioles; F-06921 Sophia-Antipolis Cedex; France, 3GPP TS 23.203, V8.4.0 (Dec. 2008).

* cited by examiner

METHOD FOR SIMPLIFYING THE CONTROL SESSION OF A USER SESSION

CROSS-REFERENCE TO RELATED APPLICATIONS

This Application is a Section 371 National Stage Application of International Application No. PCT/FR2015/050941, filed Apr. 9, 2015, which is incorporated by reference in its entirety and published as WO 2015/158991 on Oct. 22, 2015, not in English.

1. FIELD OF THE INVENTION

The patent application relates to the field of control of the communication sessions between a mobile terminal and a packet communication network, via a mobile network.

2. PRIOR ART

In mobile networks according to the 3GPP standards (3rd Generation Partnership Project) on the basis of version 8, finalized in December 2008, in particular according to the TS 23.203 specification, it is possible to modify the quality of service (QoS) parameters and the charging rules applied to an existing communication session according to events occurring during the communication session.

The QoS parameters and the charging rules are commonly grouped under the name of PCC rules (Policy and Charging Control rules). The communication session is carried by a connection, referred to as a PDN (Packet Data Network) connection, set up between the terminal and a gateway, referred to as a PGW or PDN gateway, at the boundary between the mobile network and the packet communication network.

In order to know which PCC rules to apply to a communication session before opening it, the PGW gateway, via a function referred to as a PCEF (Policy and Charging Enforcement Function), opens a control session with a centralized control device, referred to as a PCRF (Policy and Charging Rules Function) control entity, so that the PGW gateway and the PCRF control entity can communicate with one another with regard to the communication session.

In particular, this control session allows the PCRF control entity to transmit an initial request to the PCEF function of the PGW gateway, including the parameters representing the communication session to be opened. These parameters include, for example, the identifier of the user, his location, the type of offering to which he has subscribed, etc.

In response, the PGW gateway receives PCC rules determined by the PCRF control entity according to the parameters of the request and opens the communication session by applying the received rules to it.

The control session is maintained until the communication session is released, since the PCRF control entity must be capable of allowing the exact billing of the usage of the communication session to the subscriber, inter alia. Moreover, events affecting the communication session may intervene, having an impact on the PCC rules which have to be applied to it. In this case, the PGW gateway, detecting the event, transmits a new request to the PCRF control entity, including new parameters representing the communication session.

The events triggering this update of the communication session are, for example, a change of access type used by the terminal, a charge-related time change, the reaching of a usage threshold, etc.

For some types of offering to which users have subscribed, no event is likely to trigger an update of the communication session. The control session nevertheless remains open until the communication session is released, which unnecessarily uses up the memory for retaining the context of the session, as well as the processing power, in both the PGW gateway and the PCRF control entity. This is all the more detrimental when the number of communication sessions that have to be controlled simultaneously by the same gateway and the same PCRF control entity is very high and increasing constantly. The portion of these sessions not subject to any update furthermore increases following the development of the M2M (machine-to-machine) communication sessions, the characteristics of which are a long duration and low traffic volume.

One of the objects of the invention is to overcome these disadvantages of the prior art.

3. DESCRIPTION OF THE INVENTION

The invention improves the situation using a method for establishing at least one control rule for a communication session between a packet communication network and a mobile terminal attached to a mobile network, referred to as a user session, the user session being carried by a connection between the mobile terminal and a gateway of the mobile network, the gateway being connected to the packet communication network, a control session being carried by a connection between the gateway and a control entity of the mobile network, the method being carried out by the control entity and including:

a step of receiving a request to open the user session, the request including parameters representing the user session;

a step of determining at least one control rule applicable to the user session according to the parameters representing the user session;

a step of transmitting a response, including the at least one control rule;

the method furthermore including:

a step of determining a parameter corresponding to a status of said at least one control rule, referred to as the status, according to the parameters representing the user session, the status indicating whether the at least one control rule is non-modifiable during the user session;

according to the value of the status, a step of inserting the status into the response, prior to the transmission step.

By means of the invention, the control entity determines a particular status which the control rules may have, and informs the gateway thereof. This allows the control entity, on the one hand, and the gateway, on the other hand, to perform or not to perform certain actions which impact on their respective resource usage.

In particular, the control entity determines the type of offering to which the user has subscribed. For some offerings, a user session will not be affected by events such as a change of charge according to a time or a change of QoS following the reaching of a usage threshold. In these cases, it is unnecessary for the control entity to continue monitoring the changes in the user session by continuing to listen for possible session update requests, since the control rules will not change, and it is therefore also unnecessary for the control entity to continue to receive such requests from the gateway.

By means of the invention, the control entity can free up memory and processing resources since it no longer needs to store parameters relating to the user session. Furthermore, the control entity informs the gateway when the status of the control rules is non-modifiable during the user session.

The status assumes either a value corresponding to "control rule modifiable during the user session", or a value corresponding to "control rule non-modifiable during the user session".

According to one aspect of the invention, the method for establishing at least one control rule furthermore includes a step of releasing the control session if the determined status indicates that the at least one control rule is non-modifiable during the user session.

The control entity does not need to maintain the control session since, as a consequence of the transmitted response, the gateway will release it for its part. The control entity can therefore anticipate this release, thus offering the advantage of eliminating an exchange for this purpose between the gateway and the control entity, and frees up memory and processing resources more quickly in the control entity.

In fact, since the control session is released, the control entity no longer needs to store a certain number of parameters, such as, inter alia, the identifier of the control session between the gateway and the control entity, the access type used by the terminal, the IP address of the terminal, the IP address of the PGW gateway, the MCC code (Mobile Country Code, France=208, for example) and the MNC code (Mobile Network Code, Orange=01 or 02, for example) of the terminal, the MSISDN code (Mobile Subscriber Integrated Services Digital Network Number), the IMSI (International Mobile Subscriber Identity) code of the subscriber, and/or the IMEI (International Mobile Station Equipment Identity) code of the terminal, the location of the terminal, etc.

According to one aspect of the invention, the response includes the status only if the determined status indicates that the at least one control rule is non-modifiable during the user session.

Advantageously, the response does not include the status if its value corresponds to "control rule modifiable during the user session". The response according to the existing standard can thus continue to be used in this case, thereby minimizing the modifications to be made to the control entity and to the gateway.

According to one aspect of the invention, the status is recorded in a field of a Diameter message.

Advantageously, no additional field is necessary if the Diameter standard is used for the exchanges between the gateway and the control entity during the control session. A CCA response (Credit Control Answer) according to the Diameter standard can thus continue to be used, thereby minimizing the modifications to be made to the control entity which generates and transmits the response, and to the gateway which receives and processes it when the invention is implemented.

According to one aspect of the invention, the field is intended to include an error code.

The value of the status advantageously corresponds to an error code according to one development of the Diameter standard. Thus, in order to implement the invention, modification of the existing standard is minimized.

According to one aspect of the invention, the step of determining the status includes a step of verifying at least one condition from a group of conditions including:
the user session corresponds to an unlimited-volume or unlimited-time usage offering,
the user session corresponds to an offering dedicated to machine-to-machine communications,
the user session corresponds to an offering restricted to a single communications service;
the verification being carried out on the basis of MSISDN, IMSI or APN (Access Point Name) parameters.

By means of the MSISDN, IMSI, or APN parameters, the control entity can identify the offering to which the user of the user session has subscribed. It can then verify whether this offering is an unlimited offering, an offering which concerns M2M communications or is restricted to a particular service such as Voice over IP, for example. In all these cases, no monitoring of the user session is required on the part of the control entity or on the part of the gateway, since the control rules are not likely to change throughout the duration of the user session.

The different aspects of the method for establishing at least one control rule which have just been described can be implemented independently from one another or in combination with one another.

The invention also relates to a method for controlling a communication session between a packet communication network and a mobile terminal attached to a mobile network, referred to as a user session, the user session being carried by a connection between the mobile terminal and a gateway of the mobile network, the gateway being connected to the packet communication network,
the method being carried out by the gateway and including:
  a step of receiving a request to open the user session,
  a step of opening a control session for controlling the user session, between the gateway and a control entity;
  a step of transmitting a request to the control entity to open the user session, the request including parameters representing the user session;
  a step of receiving a response from the control entity, including at least one control rule applicable to the user session, determined according to the parameters representing the user session;
  a step of applying the at least one received control rule to the user session;
  a step of opening the user session;
the response furthermore including a parameter corresponding to a status of said at least one control rule, referred to as the status,
and, if the value of the status indicates whether the at least one control rule is non-modifiable during the user session, the step of receiving a response is followed immediately by a step of releasing the control session, the user session being maintained.

According to the status of the control rule(s), received with the response, the gateway can determine that an association between the user session and the control session is no longer necessary. In this case, the gateway releases the control session, thus freeing up memory and processing resources, but does not release the user session. In fact, the gateway needs to store only a minimum of parameters identifying the user session, enough to be able to release it on receiving a request to release the user session, but no longer needs to maintain an open session with the control entity since it will not transmit any request to update the user session. It does not need to store, for example, the identifier of the control session and the IP address of the control entity, or monitor the events normally triggering an update of the control session, unlike the prior art.

The invention also relates to a device for establishing at least one control rule capable of carrying out the method of establishing at least one control rule which has just been described, in all its embodiments. This is a device for establishing at least one control rule for a communication session between a packet communication network and a mobile terminal attached to a mobile network, referred to as a user session, the user session being carried by a connection between the mobile terminal and a gateway of the mobile network, the gateway being connected to the packet communication network, a control session being carried by a connection between the gateway and a control entity of the mobile network, the device being included in the control entity and including:
- a module for receiving a request to open the user session, the request including parameters representing the user session;
- a module for determining at least one control rule applicable to the user session according to the parameters representing the user session;
- a module for determining a parameter corresponding to a status of said at least one control rule, referred to as the status, according to the parameters representing the user session, the status indicating whether the at least one control rule is non-modifiable during the user session;
- a module for inserting the status into a response furthermore including the at least one control rule;
- a module for transmitting the response.

The invention also relates to a PCRF control entity, including the device for establishing at least one control rule which has just been described.

The invention also relates to a device for controlling a communication session capable of carrying out the communication session control method which has just been described, in all its embodiments. This is a device for controlling a communication session between a packet communication network and a mobile terminal attached to a mobile network, referred to as a user session, the user session being carried by a connection between the mobile terminal and a gateway of the mobile network, the gateway being connected to the packet communication network, the device being included in the gateway and including:
- a module for receiving a request to open the user session;
- a module for opening a control session of the user session between the gateway and a control entity;
- a module for transmitting a request to the control entity to open the user session, the request including parameters representing the user session;
- a module for receiving a response from the control entity, including at least one control rule applicable to the user session, determined according to the parameters representing the user session;
- a module for applying the at least one received control rule to the user session;
- a module for opening the user session;
- a module for releasing the control session;

the control session being released and the user session being maintained if the response includes a parameter corresponding to a status of said at least one control rule, referred to as the status, and if the value of the status indicates that the at least one control rule is non-modifiable during the user session.

The invention also relates to a PDN gateway, including the device for controlling a communication session which has just been described.

The invention also relates to a signal carrying a message originating from a control entity and destined for a gateway of a mobile network, the message including at least one control rule intended to be applied to a communication session between a packet communication network and a mobile terminal attached to the mobile network, referred to as a user session, the user session being carried by a connection between the mobile terminal and the gateway of the mobile network, the gateway being connected to the packet communication network, a control session being carried by a connection between the gateway and the control entity, the message furthermore including a Diameter error code indicating that the at least one control rule is non-modifiable during the user session, the reception of the signal by the gateway triggering the release of the control session and the maintenance of the user session.

The invention also relates to a computer program including instructions for implementing the steps of the method for establishing at least one control rule for a communication session which has just been described, when this program is executed by a processor.

The invention also relates to a recording medium readable by a control entity on which the program which has just been described is recorded, which can use any programming language and can be in the form of source code, object code or intermediate code between source code and object code, such as in a partially compiled form, or in any other desirable form.

The invention also relates to a computer program including instructions for implementing the steps of the method for controlling a communication session which has just been described, when this program is executed by a processor.

The invention finally relates to a recording medium readable by a mobile network gateway on which the program which has just been described is recorded, which can use any programming language and can be in the form of source code, object code or intermediate code between source code and object code, such as in a partially compiled form, or in any other desirable form.

4. PRESENTATION OF THE FIGURES

Figure 2:
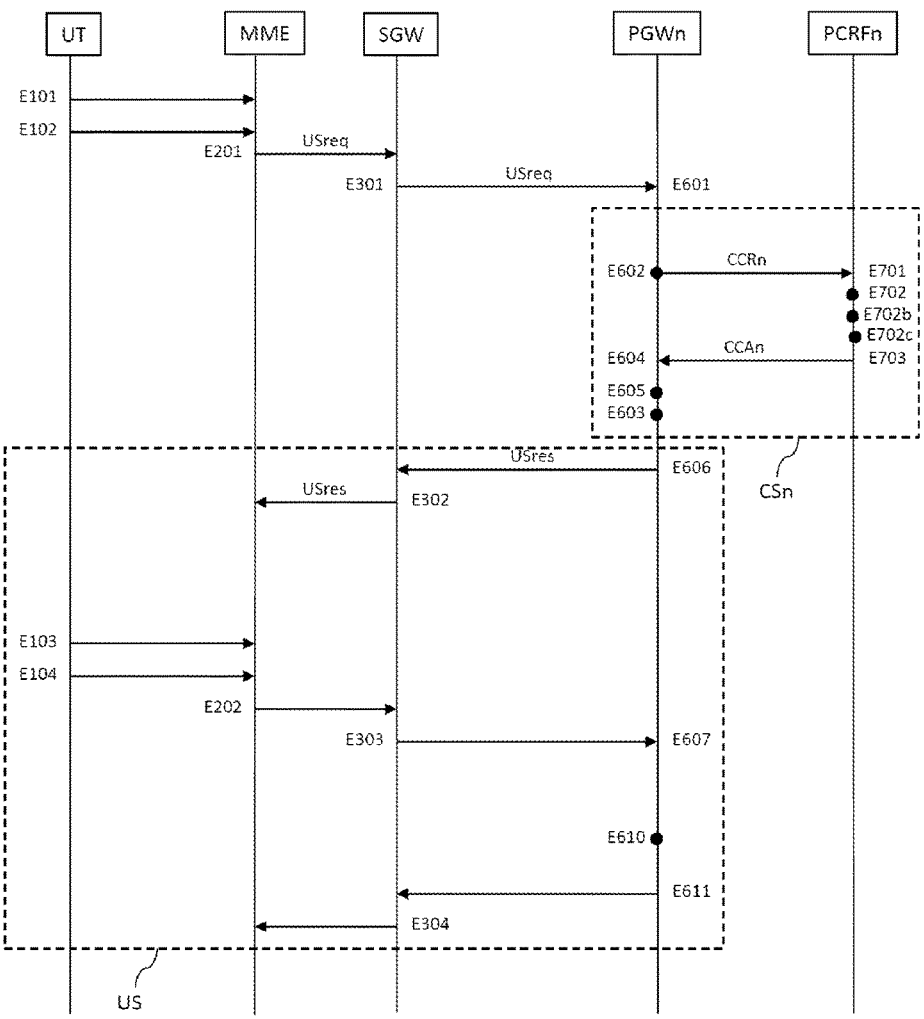
Figure 3:
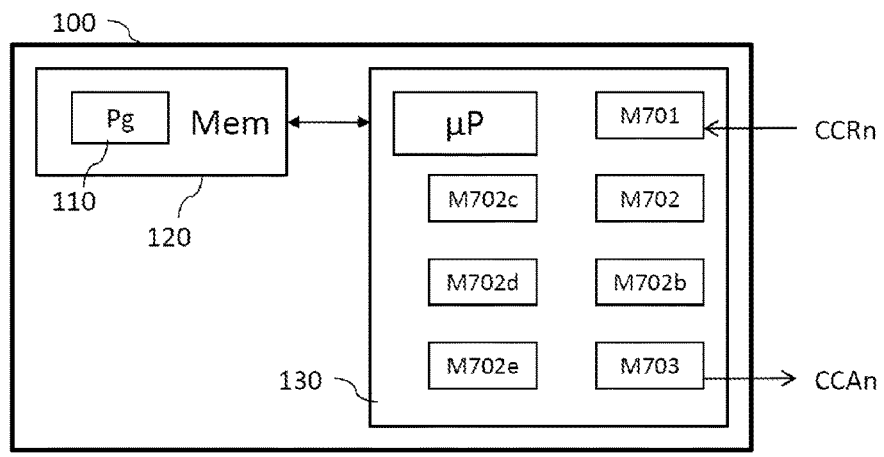
Figure 4:
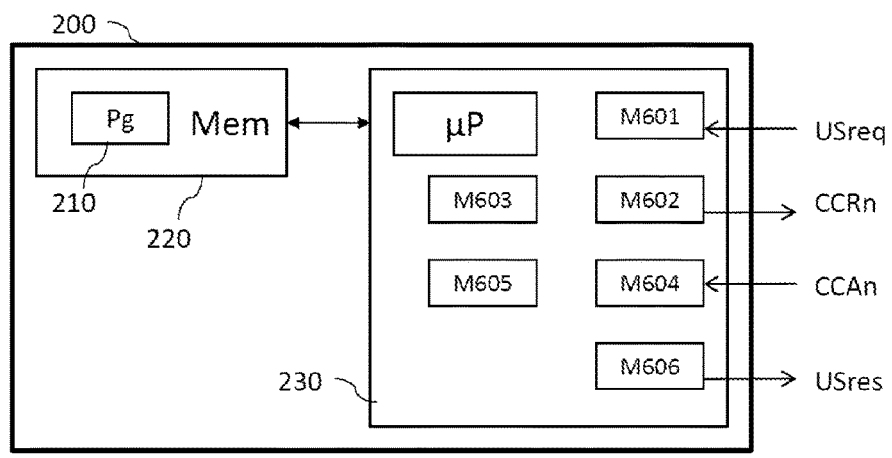

Other advantages and characteristics of the invention will become clearer from a reading of the following description of a particular embodiment of the invention, given by way of a simple, illustrative and non-limiting example, and the attached drawings, in which:

FIG. 1 shows an example of concatenation and implementation of the steps of a method for establishing at least one control rule for a communication session, and of a communication session control method, according to the prior art, FIG. 2 shows an example of concatenation and implementation of the steps of the method for establishing at least one control rule for a communication session, and of the communication session control method, according to one aspect of the invention, FIG. 3 shows an example of the structure of a device for establishing at least one control rule for a communication session, according to one aspect of the invention, FIG. 4 shows an example of the structure of a device for controlling a communication session, according to one aspect of the invention.

5. DETAILED DESCRIPTION OF AT LEAST ONE EMBODIMENT OF THE INVENTION

In the description that follows, examples of a plurality of embodiments of the invention are presented, based on an LTE/EPC network (Long Term Evolution/Evolved Packet Core, 3GPP standard also known by the name of 4G), but the invention also applies to other access networks using a PCEF function in a device, such as, for example, a GGSN (GPRS Gateway Support Node) router in a UMTS/GPRS network (Universal Mobile Telecommunications System/ General Packet Radio Service, 3GPP standard also known by the name of 3G) or an IP Edge router in a "Fixed Broadband Access" network.

FIG. 1 shows an example of concatenation and implementation of the steps of a method for establishing at least one control rule for a communication session, and of a communication session control method, according to the prior art.

In the mobile core network EPC architecture defined by the 3GPP standard on the basis of Release 8, a plurality of entities participate in the establishment of a user session US between the terminal UT and the gateway PGW: the Mobility Management Entity (MME), the Serving Gateway (S-GW) and the PDN Gateway (P-GW).

The management entity MME is an EPC control plan (signaling) entity, the aim of which is to manage the mobility procedures (signaling between the nodes of the core network for mobility).

The Serving Gateway (S-GW) provides, inter alia, the anchoring of the media when the mobile changes radio access points during a session, and charging and buffering functionalities of the media destined for the end user when radio connectivity is not yet established.

The PDN Gateway (P-GW) provides, inter alia, IP connectivity to end users (IP address allocation) and functionalities for charging and for the application of advanced QoS (Quality of Service) policy, by means of its PCEF function.

The PCRF (Policy & Charging Rules Function) control entity: this is the entity for controlling the mobile network, according to the different data transmitted by the network (access type, S-GW address, etc.), the user database (type of offering, etc.) or information relating to the service such as codec, media type. The PCRF control entity communicates the QoS and billing characteristics for the user session.

The OCS (Online Charging System) credit/balance usage entity controls the credit and balance available to users. According to the billing characteristics received from the PCRF control entity, the PCEF function of the gateway PGW opens a credit control session with the OCS in order to allow a real-time control of the balance of the user.

During the procedure for opening a user session US (also referred to as an IP connectivity session or "IP CAN session"), the PCEF function of the gateway PGW opens an associated control session CS to the PCRF control entity and communicates QoS and billing characteristics to it for this user session US, taking into account the set or a subset of parameters which the PCEF function has received from different entities:
- identifier of the mobile network APN, access type (3G, 4G), address of the gateway S-GW, country code MCC, mobile operator code MNC;
- type of offering to which the user has subscribed, usage limit;
- name of the service or application accessed by the user, media type and format, codecs used.

The term "gateway PGW" or the term "gateway PGWn" is used below to refer without distinction to either the gateway or the PCEF function which it includes.

During a step E101, the terminal UT transmits a request to the management entity MME for attachment to the mobile network, "Attach request", followed, during a step E102, by a "PDN connectivity request".

During a step E201, the management entity MME transmits a request USreq to the gateway SGW to open the user session US, which the gateway SGW forwards to the gateway PGW during a step E301.

During a step E401, the gateway PGW receives the request to open the user session US. Before replying to this request, the gateway PGW must retrieve the control rules applicable to this session. To do this, it must open a session CS, referred to as a control session, with the control entity PCRF.

During a step E402, the gateway PGW then transmits an initial request CCRi ("Credit Control Request"), for example a Diameter request. This request CCRi opens the control session CS and includes the following parameters:
- control session identifier;
- IMSI and/or MSISDN of the user;
- access type;
- APN;
- IP address of the gateway S-GW;
- MCC and MNC of the gateway S-GW;
- IP address of the gateway PGW;
- IP address of the user;
- MCC and MNC of the user.

After receiving the request CCRi during a step E501, the control entity PCRF then determines, during a step E502, the set of control rules applicable to the requested session US, according to the received parameters. For example, if the MSISDN or IMSI parameter corresponds to a prepaid user offering, a user credit control will be applied.

During a step E503, the control entity PCRF transmits an initial response CCAi ("Credit Control Answer"), for example a Diameter response.

This response CCAi includes the following parameters:
- control session identifier;
- Quality of Service to be applied to each service;
- Quality of Service to be applied to the user session;
- services to be blocked or authorized;
- whether the user credit control is applicable or not to each service;
- usage limit for each service or for the entire user session if applicable.

After receiving the response CCAi during a step E404, the PGW then applies, during a step E405, the set of received control rules to the requested user session US. The user session US is then opened by the gateway PGW during a step E406 during which a response USres to open the user session is transmitted from the gateway PGW to the gateway SGW, which the gateway SGW forwards to the management entity MME during a step E302. The user session US begins at this stage.

For the entire duration of the user session US, this session can be updated either at the instigation of the control entity PCRF or at the instigation of the gateway PGW.

In the event of an update by the operator of the type of offering to which the user has subscribed, or in the event of a change of characteristic of the service initiated by the operator, the control entity PCRF is notified before the gateway PGW, during a step E521. The control entity PCRF then transmits an update to the gateway PGW, during a step E523, by means of a message RAR, including new control rules, to which the Gateway PGW replies with an RAA acknowledgement message (not shown).

Events impacting on the mobile network are for their part detected initially by the gateway PGW, during a step E421, such as, for example, a change of access type, a time change linked to a change of charge or Quality of Service, a reaching of a usage threshold linked to a change of capacity or bandwidth. The gateway PGW then transmits an update request CCRu to the control entity PCRF, during a step E422, and, during a step E423, receives an update response CCAu in return.

In any event, during a step E424, the gateway PGW applies the control rules updated by the message CCAu to the user session US without interrupting it.

A plurality of cycles of steps E421 to E424 or E521 and E523, or no cycle, may take place.

At the end of the user session US, during a step E103, the terminal UT transmits a request to the management entity MME for detachment from the mobile network, "Detach request", followed, during a step E104, by an end-of-connectivity request, "PDN connectivity request".

During a step E202, the management entity MME transmits a "release session request" to the gateway SGW to release the user session, said request being forwarded by the gateway SGW to the gateway PGW during a step E303.

During a step E407, the gateway PGW receives the user session release request. Before replying to this request, the gateway PGW must obtain authorization to release this session. To do this, the gateway PGW then transmits, during a step E408, a terminal request CCRt ("Credit Control Request"), for example a Diameter request. This request CCRt includes the following parameters:
control session identifier;
MSISDN or IMSI;
reason for releasing the session;
usage if applicable.

After receiving the request CCRt during a step E504, the control entity PCRF then transmits a terminal response CCAt ("Credit Control Answer"), for example a Diameter response, during a step E505.

This response CCAt includes the following parameters:
control session identifier;
acknowledgement.

After receiving the response CCAt during a step E409, the PGW, during a step E410, deletes the set of control rules of the user session US to be released, and, during a step E403, releases the control session CS. The user session US is then released by the gateway PGW during a step E411, where a "release session response" to release the user session is transmitted from the gateway PGW to the gateway SGW, said response being forwarded by the gateway SGW to the management entity MME during a step E304. The user session US has ended at this stage.

FIG. 2 shows an example of concatenation and implementation of the steps of the method for establishing at least one control rule for a communication session according to one aspect of the invention, and of the communication session control method according to one aspect of the invention.

Steps E101 to E104, E201 to E202 and E301 to E304 have been shown with reference to FIG. 1.

The method for controlling a communication session according to the invention is carried out by the gateway PGWn and includes steps E601 to E611, including E605b.

The method for establishing at least one control rule for a communication session according to the invention is carried out by the control entity PCRFn and includes steps E701 to E703, including E702b and E702c.

During a step E601 similar to step E401 shown in FIG. 1, the gateway PGWn receives the request to open the user session US. Before replying to this request, the gateway PGWn must retrieve the control rules applicable to this session. To do this, it must open a control session CSn with the control entity PCRFn.

During a step E602 similar to step E402 shown in FIG. 1, the gateway PGWn then transmits an initial request CCRn ("Credit Control Request"), for example a Diameter request. This request CCRn opens the control session CSn and includes parameters similar to those of the request CCRi shown in FIG. 1.

After receiving the request CCRn during a step E701 similar to step E501 shown in FIG. 1, the control entity PCRFn then determines, during a step E702 similar to step E502 shown in FIG. 1, the set of control rules applicable to the requested session US, according to the received parameters.

Unlike the prior art, the method for establishing at least one control rule for a communication session according to the invention furthermore includes a step E702b, following, preceding, or simultaneous with step E702, where the control entity PCRFn determines whether the control rules determined or to be determined during step E702 have a particular status. This determination is carried out according to the parameters received in step E701, and must therefore follow it.

For example, the control entity PCRFn determines, during step E702b, whether the control rules are modifiable throughout the duration of the user session US. Among the parameters received in the request CCRn, the MSISDN or IMSI and APN parameters, for example, are determining since they identify the type of offering to which the user has subscribed. For some offerings, the control rules applying to a user session are time-invariant, for example for all the offerings including unlimited-data-volume or unlimited-time usage, or for specific offerings such as single-service offerings (such as exclusive Voice over IP) or offerings dedicated to machine-to-machine (M2M) communications. On the basis of these determining parameters, the control entity PCRFn therefore determines whether any updates are possible or impossible in respect of the control rules to be applied to the user session.

During a step E702c, if it is determined that the control rules are non-modifiable, the control entity PCRFn includes this information in the response CCAn ("Credit Control Answer"), for example a Diameter response.

During a step E703, this response CCAn is transmitted to the gateway PGWn.

In addition to the parameters similar to those of the request CCAi shown in FIG. 1, this response CCAn includes a parameter corresponding to the status of the control rules, as determined during step E702b. This status parameter may, for example, be in the form of new error code added to the existing error codes, according to one development of the Diameter standard, this error code being intended to be included in a field whose location is already provided in the structure of the messages CCR and CCA. This field may, for example, be "Result Code AVP". Existing Diameter error codes are:
DIAMETER_PCC_BEARER_EVENT (4141);
DIAMETER_AN_GW_FAILED (4143);
DIAMETER_PENDING_TRANSACTION (4144).

The response CCAn, transmitted during step E703, transports a new error code according to one development of the Diameter standard, which may be, for example:
DIAMETER_NO_MORE_POLICY_CONTROL_APPLICABLE (4145).

Alternatively, the status of the control rules may be transported in a field of the messages CCR and CCA other than the "Result Code AVP" field, either existing but unused, or additional, according to another development of the Diameter standard.

After receiving the response CCAn during a step E604, the PGWn applies the set of received control rules to the requested user session US, during a step E605.

If the response CCAn includes a status parameter and if its value is "non-modifiable", for example the Diameter error code 4145 described above, this means that the control rules applicable to the session US are not modifiable, and there will be no update cycle similar to that of steps E421 to E424 or E521 and E523 described with reference to FIG. 1. In this case, during a step E603, the gateway PGWn closes the control session CSn.

Since the session CSn is released, the gateway PGWn no longer has to store the identifier of the control session and the IP address of the control entity PCRFn.

Similarly, since the session CSn is released, the control entity PCRFn no longer has to store the control session identifier, the access type, the IP address of the gateway S-GW, the IP address of the user terminal, the MCC code and the MNC code of the gateway S-GW, the IP address of the gateway PGWn, the MCC code and the MNC code of the user terminal, the MSISDN code, the IMSI code, and/or the IMEI code of the user terminal, and the location of the user terminal.

The user session US is then opened by the gateway PGWn during a step E606 similar to step E406 shown in FIG. 1, where a "create session response" to open the user session is transmitted from the gateway PGW to the gateway SGW, said response being forwarded by the gateway SGW to the management entity MME during a step E302. The user session US begins at this stage.

At the end of the user session US, during a step E103, the terminal UT transmits a request to the management entity MME for detachment from the mobile network, "Detach request", followed, during a step E104, by an end-of-connectivity request, "PDN connectivity request".

During a step E202, the management entity MME transmits a "release session request" to the gateway SGW to release the user session, said request being forwarded by the gateway SGW to the gateway PGWn during a step E303.

During a step E607, similar to step E407 shown in FIG. 1, the gateway PGWn receives the user session release request. Since no control session exists, the gateway PGWn cannot obtain the authorization from the control entity PCFRn and itself takes the immediate decision to delete, during a step E610, the set of control rules for the user session US to be released. The user session US is then released by the gateway PGWn during a step E611, similar to step E411 shown in FIG. 1, where a "release session response" to release the user session is transmitted from the gateway PGWn to the gateway SGW, said response being forwarded by the gateway SGW to the management entity MME during a step E304. The user session US has ended at this stage.

FIG. 3 shows an example of the structure of a device for establishing at least one control rule of a communication session according to one aspect of the invention.

The device 100 carries out the method for establishing at least one control rule for a communication session, different embodiments of which have just been described.

A device 100 of this type may be implemented in a control entity specialized in the establishment of PCC control rules (QoS and billing characteristics) for IP connectivity sessions (user sessions), for example in a "Policy Control and Charging Rules Function" device (PCRF, policy and charging rules function).

For example, the device 100 includes a processing unit 130, equipped, for example, with a microprocessor μP and controlled by a computer program 110, stored in a memory 120 and carrying out the method for establishing at least one control rule of a communication session according to the invention. On initialization, the code instructions of the computer program 110 are, for example, loaded into a RAM memory before being executed by the processor of the processing unit 130.

A device 100 of this type includes:
- a reception module (M701), capable of receiving a request CCRn to open a user session, the request including parameters representing the user session;
- a determination module (M702), capable of determining at least one control rule applicable to the user session, according to the parameters representing the user session;
- a determination module (M702*b*), capable of determining a parameter corresponding to a status of said at least one control rule, referred to as the status, according to the parameters representing the user session, the status indicating whether the at least one control rule is non-modifiable during the user session;
- an insertion module (M702*c*), capable of inserting the determined status into a response CCAn to the open request;
- a transmission module (M703), capable of transmitting the response CCAn, also including the at least one determined control rule.

The processing unit 130 may advantageously include:
- a module (M702*d*) for verifying, on the basis of the MSISDN, IMSI or APN parameters representing the user session, at least one condition from a group of conditions including:
  - the user session corresponds to an unlimited-volume or unlimited-time usage offering,
  - the user session corresponds to an offering dedicated to machine-to-machine communications,
  - the user session corresponds to an offering restricted to a single communications service,
  - the status indicating that the at least one control rule is non-modifiable during the user session if one of the conditions is verified;
- a module (M702*e*) for releasing a control session opened on reception of the request to open a user session, if the determined status indicates that the at least one control rule is non-modifiable during the user session.

The modules described in relation to FIG. 3 can be hardware or software modules.

FIG. 4 shows an example of the structure of a device for controlling a communication session according to one aspect of the invention.

The device 200 carries out the method for controlling a communication session, different embodiments of which have just been described.

A device 200 of this type may be implemented in a PDN Gateway (P-GW) which provides, inter alia, IP connectivity to end users (IP address allocation) and charging and application of advanced QoS (Quality of Service) policy functionalities by means of its PCEF function.

For example, the device 200 includes a processing unit 230, equipped, for example, with a microprocessor μP and controlled by a computer program 210, stored in a memory 220 and carrying out the method for controlling a communication session according to the invention. On initialization, the code instructions of the computer program 210 are, for example, loaded into a RAM memory before being executed by the processor of the processing unit 230.

A device 200 of this type includes:
- a reception module (M601), capable of receiving a request USreq to open the user session;
- an opening module (M602), capable of opening a control session for the user session, between the gateway and the control entity;
- a transmission module (M602), capable of transmitting a request CCRn to the control entity to pen the user session, the request including parameters representing the user session;
- a reception module (M604), capable of receiving a response from the control entity, including at least one control rule applicable to the user session, determined according to the parameters representing the user session;
- an application module (M605), capable of applying the at least one received control rule to the user session;
- an opening module (M606), capable of opening the user session and transmitting a response USres to the request USreq;
- a release module (M603), capable of releasing the control session while keeping the user session open if the response includes a parameter corresponding to a status of said at least one control rule, referred to as the status, and if the value of the status indicates that the at least one control rule is non-modifiable during the user session.

The modules described in relation to FIG. 4 can be hardware or software modules.

The example embodiments of the invention that have just been presented are only some of the conceivable embodiments. They show that the invention simplifies the exchanges between a PCRF control entity and the PCEF function of a PDN Gateway by shortening the duration of the control session between the two devices to the maximum extent when this session controls a user session, the rules of which, determined by the PCRF control entity, are non-modifiable.

The invention claimed is:

1. A method for establishing at least one control rule for a communication session between a packet communication network and a mobile terminal attached to a mobile network, referred to as a user session, the user session being carried by a connection between the mobile terminal and a gateway of the mobile network, the gateway being connected to the packet communication network, a control session being carried by a connection between the gateway and a control entity of the mobile network, the method being carried out by the control entity and including the following acts:
   opening the control session with the gateway through the mobile network;
   receiving a request originating from the mobile terminal to open the user session, the request including parameters representing the user session;
   determining at least one control rule applicable to the user session according to the parameters representing the user session;
   transmitting to the gateway, through the mobile network a response to the request, including the at least one control rule;
   determining a parameter corresponding to a status of said at least one control rule, according to the parameters representing the user session, the status indicating whether the at least one control rule is non-modifiable during the user session;
   according to the value of the status, inserting the status into the response, prior to the act of transmitting; and
   releasing the control session between the control entity and the gateway if the determined status indicates that the at least one control rule is non-modifiable during the user session, the user session between the mobile terminal and the packet communication network being maintained.

2. The method for establishing at least one control rule as claimed in claim 1, wherein the response includes the status only if the determined status indicates that the at least one control rule is non-modifiable during the user session.

3. The method for establishing at least one control rule as claimed in claim 1, wherein the status is recorded in a field of a Diameter message.

4. The method for establishing at least one control rule as claimed in claim 3, wherein the field is a Result Code Attribute Value Pair (AVP) field.

5. The method for establishing at least one control rule as claimed in claim 1, wherein determining the status includes verifying at least one condition from a group of conditions consisting of:
   the user session corresponds to an unlimited-volume or unlimited-time usage offering,
   the user session corresponds to an offering dedicated to machine-to-machine communications,
   the user session corresponds to an offering restricted to a single communications service;
   the verification being carried out on the basis of Mobile Subscriber Integrated Services Digital Network (MSISDN), International Mobile Subscriber Identity (IMSI) or Access Point Name (APN) parameters.

6. A method for controlling a communication session between a packet communication network and a mobile terminal attached to a mobile network, referred to as a user session, the user session being carried by a connection between the mobile terminal and a gateway of the mobile network, the gateway being connected to the packet communication network, the method being carried out by the gateway and including the following acts:
   receiving a request originating from the mobile terminal to open the user session,
   opening a control session for controlling the user session, between the gateway and a control entity, through the mobile network;
   transmitting through the mobile network a request to the control entity to open the user session, the request including parameters representing the user session;
   receiving a response from the control entity, including at least one control rule applicable to the user session, determined according to the parameters representing the user session;
   applying the at least one received control rule to the user session; and
   opening the user session with the mobile terminal;
   wherein the response furthermore includes a parameter corresponding to a status of said at least one control rule, referred to as the status,
   and,
   if the value of the status indicates the at least one control rule is non-modifiable during the user session, the act of receiving a response is followed immediately by releasing the control session between the control entity and the gateway, the user session between the mobile terminal and the packet communication network being maintained.

7. A device for establishing at least one control rule for a communication session between a packet communication network and a mobile terminal attached to a mobile network, referred to as a user session, the user session being carried by a connection between the mobile terminal and a gateway of the mobile network, the gateway being connected to the packet communication network, a control session being carried by a connection between the gateway and a control entity of the mobile network, the device being included in the control entity and including:
a processor; and
a non-transitory computer-readable medium comprising instructions stored thereon,
which when executed by the processor configure the control entity to perform acts comprising:
opening the control session with the gateway through the mobile network;
receiving a request originating from the mobile terminal to open the user session, the request including parameters representing the user session;
determining at least one control rule applicable to the user session according to the parameters representing the user session;
transmitting to the gateway, through the mobile network, a response to the request, including the at least one control rule;
determining a parameter corresponding to a status of said at least one control rule, referred to as the status, according to the parameters representing the user session, the status indicating whether the at least one control rule is non-modifiable during the user session;
inserting the status into the response; and
releasing the control session between the control entity and the gateway if the determined status indicates that the at least one control rule is non-modifiable during the user session, the user session between the mobile terminal and the packet communication network being maintained.

8. A device for controlling a communication session between a packet communication network and a mobile terminal attached to a mobile network, referred to as a user session, the user session being carried by a connection between the mobile terminal and a gateway of the mobile network, the gateway being connected to the packet communication network, the device being included in the gateway and including:
a processor; and
a non-transitory computer-readable medium comprising instructions stored thereon, which when executed by the processor configure the gateway to perform acts comprising:
receiving a request originating from the mobile terminal to open the user session,
opening a control session of the user session between the gateway and a control entity, through the mobile network;
transmitting through the mobile network a request to the control entity to open the user session, the request including parameters representing the user session;
receiving a response from the control entity, including at least one control rule applicable to the user session, determined according to the parameters representing the user session;
applying the at least one received control rule to the user session;
opening the user session with the mobile terminal;
wherein the response furthermore includes a parameter corresponding to a status of said at least one control rule, referred to as the status; and
if the value of the status indicates the at least one control rule is non-modifiable during the user session, the act of receiving a response is followed immediately by releasing the control session between the control entity and the gateway, the user session between the mobile terminal and the packet communication network being maintained.

* * * * *